United States Patent [19]

Miller et al.

[11] Patent Number: 5,563,973
[45] Date of Patent: Oct. 8, 1996

[54] TEMPERATURE COMPENSATED FIBER FABRY-PEROT FILTERS

[75] Inventors: Calvin M. Miller, Atlanta; Jeffrey W. Miller, Symrna, both of Ga.

[73] Assignee: Micron Optics, Inc., Atlanta, Ga.

[21] Appl. No.: 454,510

[22] Filed: May 30, 1995

Related U.S. Application Data

[60] Division of Ser. No. 287,823, Aug. 9, 1994, which is a continuation-in-part of Ser. No. 135,679, Oct. 13, 1993, Pat. No. 5,375,181, and a continuation-in-part of Ser. No. 161,702, Dec. 3, 1993, Pat. No. 5,422,970.

[51] Int. Cl.⁶ .................................................. G02B 6/36
[52] U.S. Cl. ............................ 385/81; 385/66; 385/72
[58] Field of Search ............................ 385/60, 62, 66, 385/72, 78, 81, 84, 136, 137

[56] References Cited

U.S. PATENT DOCUMENTS

| | | | |
|---|---|---|---|
| 5,159,655 | 10/1992 | Ziebol et al. | 385/81 |
| 5,179,608 | 1/1993 | Ziebol et al. | 385/72 |
| 5,381,500 | 1/1995 | Edwards et al. | 385/62 |
| 5,425,039 | 6/1995 | Hsu et al. | 385/73 |

*Primary Examiner*—Rodney B. Bovernick
*Assistant Examiner*—Robert E. Wise
*Attorney, Agent, or Firm*—Greenlee & Winner, PC

[57] ABSTRACT

This invention relates to temperature compensated FFPs with improved means for alignment of optical fibers. The invention provides ferrule holders with shaped ferrule passageways, as components of FFP alignment fixtures, in which optical fiber ends can be readily aligned using the ferrule rotary alignment method. The ferrule holders have a composite structure facilitating temperature compensation required for applications to PZT-tuned FFPs. The ferrule holder has a core and peripheral region made of materials having different thermal expansion coefficients. The holder core in contact with the ferrule is made of a material having a thermal expansion coefficient substantially matched to that of the ferrule material. In addition, ferrule holders are provided with a means for changing the points of contact between a secured ferrule and its holder which allows wavelength drift as a function of temperature in FFPs to be adjusted.

24 Claims, 6 Drawing Sheets

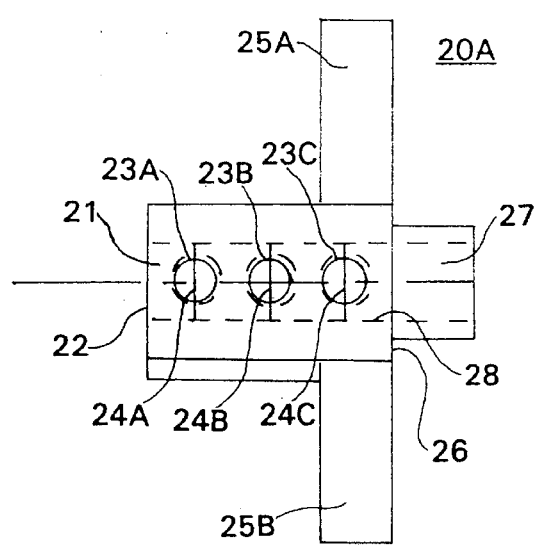
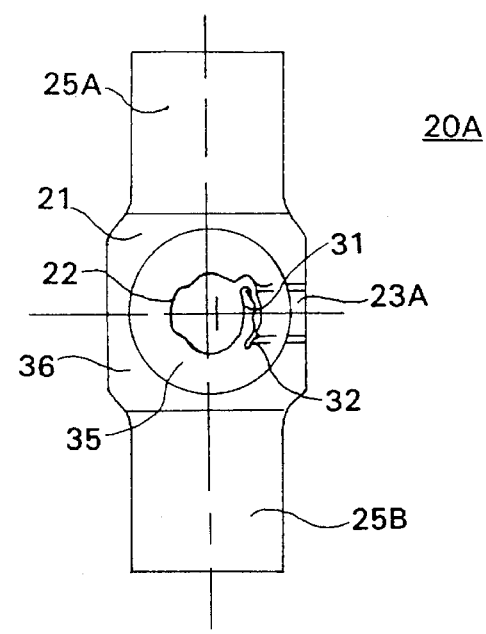
FIGURE 2A
FIGURE 2C
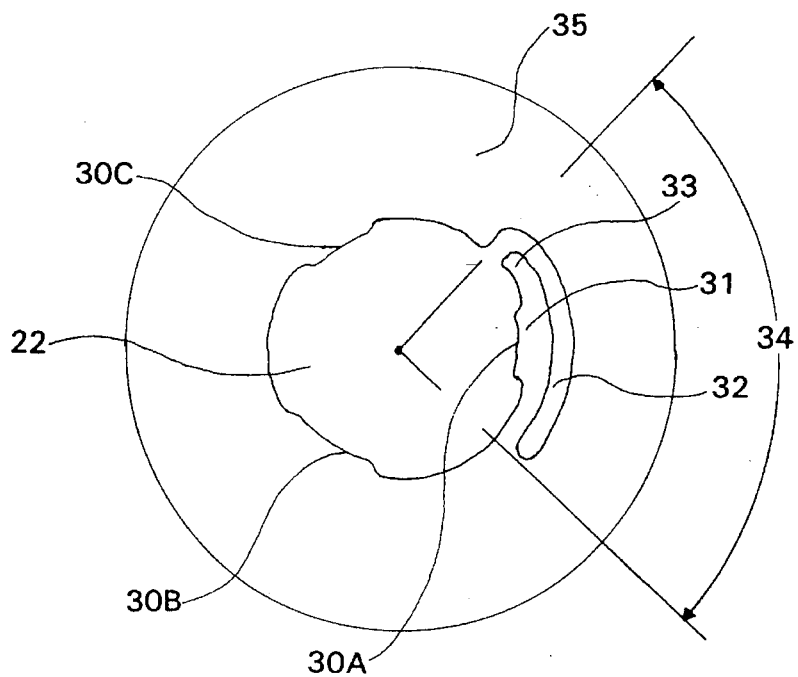
FIGURE 2B

TEMPERATURE COMPENSATED FIBER FABRY-PEROT FILTERS

This application is a division of U.S. patent application Ser. No. 08/287,823, filed Aug. 9, 1994, which is incorporated in its entirety by reference herein. U.S. Ser. No. 08/287,823 is in turn a continuation-in-part of U.S. patent application Ser. No. 08/135,679, now U.S. Pat. No. 5,375,181, filed Oct. 13, 1993, now allowed, and U.S. Ser. No. 08/161,702, now U.S. Pat. No. 5,422,970, filed Dec. 3, 1993, both of which are incorporated in their entirety by reference herein.

FIELD OF THE INVENTION

This invention is in the field of fiber optics and relates specifically to ferrule holders and ferrule alignment fixtures useful for making low-loss optic fiber connections and particularly useful in fiber Fabry-Perot filters (FFPs). The holders and fixtures of this invention are also useful in temperature compensated FFPs.

BACKGROUND OF THE INVENTION

Transmission of information by light over optical fibers is widely used in long-haul telecommunication systems. Optical signals are generated, transported along optical fibers and detected to regenerate the original electronic signal with as little change as possible. Fiber transmission media are combined with electronic signal processing resulting in lowered cost and high quality digital transmission.

In general, fiber optic systems require fiber connectors for precise alignment of optic fiber ends within the system. One technique for making fiber connections employs fiber ferrules which are cylindrical, typically glass, elements supporting optic fibers in an axially passageway with a fiber end flush with one end of the ferrule. Connections are made by aligning ferrules with fiber ends opposed in an alignment fixture.

Fiber optic system applications require direct optical processing of signals without conversion to electronic signals necessitating optical signal processors such as amplifiers, multiplex/demultiplexes, splitters, couplers, filters, equalizers, and switches adapted for use with optical fibers. Economical, low-loss, easily and reproducibly manufactured, single-mode optical fiber filters, adaptable to a desired bandwidth, FSR and finesse, are important components for such fiber optic systems. A fiber Fabry-Perot (FFP) interferometric filter is such a filter.

FFPs with optical properties suitable for telecommunication applications employing fiber ferrules to create optical cavities have been described. These FFPs contain fiber ferrule assemblies with aligned optical fiber extending through the ferrules forming an optically continuous path containing a tunable optical cavity. Two highly reflective, preferably plane-parallel mirrors, in the ferrule assembly transverse to the fiber path create the optical cavity. Ferrules are supported in precision fixtures with fibers aligned to maximize signal transmission through the assembly. This design eliminates the need for collimating and focusing lenses, improves stability and optical performance and makes the FFPs compatible with single-mode optical fibers and other fiber devices.

C. M. Miller U.S. Pat. No. 5,212,745, for example, describes the transmission characteristics of a typical FFP. An FFP is tuned between successive resonance maxima by, for example, changing the optical cavity length, $l_c$. (Alternatively, tuning of an FFP can be accomplished by changing the index of refraction, n.) The bandwidth (BW) is the full width at half maximum. The finesse of the filter, F=FSR/BW, can be measured experimentally by measuring the ratio of FSR to BW from the transmission curves generated by varying $l_c$ with constant wavelength, $\lambda$. Measuring F in this manner accounts for all non-dispersive losses including mirror absorption, diffraction and alignment losses. If $\lambda$ is varied to generate transmission curves, dispersive properties of the mirrors, fibers, and cavity modes are also included in the measured FSR.

Fixed-wavelength and tunable-wavelength FFPs having aligned ferrule assemblies have been described. Changing the distance between optic fiber ends in the cavity or stretching an optical fiber in the cavity tunes the wavelength. Tuning can be accomplished by controlled temperature variation of the FFP (temperature-tuned) or by changing the relative position of the ferrule elements, without destroying alignment, for example, by electromechanical means such as piezoelectric transducers.

Ferrule configurations for FFP filters having either a continuous fiber or a fiber gap in the optical cavity have been described. (J. Stone and L. W. Stulz (1987) Elect. Lett., 23(15):781–783). FFP configurations having a fiber gap are preferred for telecommunications applications. The Stone and Stulz Type III FFP configuration has an internal fiber-containing waveguide positioned between opposed faces of two fiber ferrules each of which has a fiber end. A mirrored-end of one ferrule and a mirrored-end of the waveguide remote from that ferrule form the optical cavity such that the fiber of the waveguide is within the optical cavity. The length of the fiber gap between the waveguide and the mirror-ended ferrule can be varied to tune the filter. U.S. Pat. No. 5,062,684 describes FFPs having two wafered ferrules, each having a wafer waveguide rigidly bonded to a mirror-ended ferrule, to form an optical cavity between the two embedded mirrors. The optical cavity in this configuration contains a tunable fiber gap between the wafered ends of the ferrules. U.S. Pat. No. 5,212,746 describes a single-wafered ferrule FFP configuration in which the optical cavity is formed by aligning a mirror-ended ferrule and a wafered ferrule with an embedded mirror.

FFP ferrules and waveguides require high precision axial alignment to minimize transmission loss. U.S. Pat. No. 4,861,136 describes FFPs tuned using piezoelectric transducers (PZTs). Elaborate alignment brackets and fixtures were necessary to change cavity length without detriment to fiber alignment. EP patent application 0 457 484 describes another alignment fixture for PZT-tuned FFPs in which ferrules are aligned by adjusting the relative tightness of set screws, which directly contact a ferrule around its circumference. U.S. Pat. Nos. 5,212,745 and 5,289,552 describe alignment fixtures which provide for adjustment of fiber alignment by use of set screws which contact a ferrule directly or indirectly via an intermediate sleeve.

G. F. De Veau and C. M. Miller U.S. Pat. No. 4,545,644 describes a rotary mechanical slice fiber ferrule alignment fixture for making fiber connections. This fixture comprises a plurality, typically three, alignment rods held within a spring bracket. At least one of the alignment rods, preferably two in a three-rod splice, includes a "flat", as defined in that patent, extending along the rod from one end for a substantial fraction of the length of the rod. Ferrules are inserted into the splice, with fiber ends opposed. The fibers are aligned by rotating the ferrules relative to each other in the splice fixture by a rotary alignment technique as described in the patent. The "flat" portions on the alignment rods provide an alignment fixture offset said to be necessary for rotary alignment. Once fiber alignment is adjusted for maximum signal transit, it is maintained by establishing a multi-point (preferably three-point) pressure contact of the alignment rods with the ferrule using a spring clip. C. M. Miller U.S. Pat. No. 5,212,745 describes a temperature tunable FFP which employs a rotary mechanical splice fixture. The rotary mechanical splice fixture has not been used in FFPs tuned using PZTs.

Signal loss due to wavelength drift and increased insertional loss as a function of temperature can be a significant problem in FFPs. An uncompensated FFP, like that of U.S. Pat. No. 5,062,684 or EP application 0 457 484, can exhibit a relatively large change in cavity length with temperature, of the order 0.05 μm/°C. representing a full FSR (free spectral range) drift over 15° C.

Since PZTs require a higher voltage at higher temperature to maintain a given length, cavity length in PZT-tuned FFPs effectively decreases with increasing temperature (with constant voltage) and these FFPs have negative temperature coefficients. Addition of a material, like aluminum, having a positive temperature coefficient in series with the PZTs compensates for the negative temperature coefficient of the PZTs. C. M. Miller and F. J. Janniello (1990) Electronics Letters 26:2122–2123. In addition, as reported in U.S. Pat. No. 5,212,745, the use of controlled thicknesses of positive temperature coefficient adhesives, such as epoxy, when constructing FFPs is important to achieve consistent temperature compensation. PZT-tuned FFPs with appropriate control circuitry can be locked on to a desired wavelength over a wide temperature range (I. P. Kaminow (1987) Electronics Letters 23:1102–1103 and D. A. Fishman et al. (1990) Photonics Technology Letters pp. 662–664). To compensate for large FFP temperature variations of cavity length, wavelength control systems can require high voltage power supplies capable of providing 60 volts to maintain a wavelength lock over a temperature range of about 30° C. (Fishman et al. supra). Passive temperature compensation can significantly reduce the voltage requirements for FFP locking circuits so that +/−12 volt power supplies, such as are conventionally employed in computer systems, can be used.

U.S. patent application Ser. No. 08/135,679 describes PZT-tuned FFPs that can be adjusted after their construction by providing ferrule holders and alignment fixtures designed to allow the points of contact between the ferrule along its length and its holder to be changed. This technique significantly improves the production yield of highly accurate, passively compensated FFPs by significantly reducing over or under compensation of the FFPs. These FFPs employ set screw adjustment for fiber alignment.

U.S. patent application Ser. No. 08/161,702 describes ferrule holders for alignment fixtures and FFPs having ferrule passageways shaped to include flats allowing fibers to be aligned by the ferrule rotary alignment techniques of U.S. Pat Nos. 4,545,644 and 5,212,745 and allowing ferrule alignment to be retained by three-point contact in the holder. These FFPs require less time and skill to achieve good alignment and are more accurate and stable than set screw alignment methods.

Ferrule holders and alignment fixtures in the U.S. Ser. No. 08/161,702 application combine rotary ferrule alignment, controlled epoxy thicknesses and adjustable temperature compensation. That patent application also describes the use of ferrule holders made of metal alloys having relatively low thermal expansion coefficients in combination with these other means of temperature compensation. The present invention provides improved designs for fiber ferrule connectors and ferrule alignment fixtures combining these beneficial features.

SUMMARY OF THE INVENTION

This invention relates to temperature compensated FFPs with improved means for alignment of optical fibers. Specifically, this invention provides ferrule holders, as components of FFP alignment fixtures, in which optical fiber ends can be readily aligned using the ferrule rotary alignment method. The inventive ferrule holders have a composite structure facilitating temperature compensation required for applications to PZT-tuned FFPs. The ferrule holders of this invention can also function in fiber optic connectors.

The inventive ferrule holders-comprise a body having a shaped longitudinal passageway for receiving and supporting a ferrule. The passageway is shaped along its longitudinal length to closely receive a ferrule and provide flat regions for multi-point, preferably three-point, contact between the ferrule and the holder. The holder also has means for securing the ferrule in the passageway to establish multi-point contact. The holder has a composite body having two portions made of different materials: a core and a peripheral region extending around the periphery of the core with both portions extending the length of the holder. The core and peripheral region are preferably symmetric with respect to the longitudinal axis of the holder. The axis of the shaped passageway is in the core of the holder, parallel to and preferably co-linear with the longitudinal axis of the holder. A ferrule secured in the passageway contacts the holder core.

Ferrules are secured in the holder by application of a force substantially perpendicular to the longitudinal axis of the ferrule. The force is applied to the ferrule at a point with respect to the passageway flats to establish multi-point, preferably three-point, contact with the core. Each flat provides a point of perpendicular contact between the ferrule, typically a cylinder, and the body of the holder.

Preferred passageways are shaped to have three flats equiangularly distributed in the core around the circumference of the passageway. Any passageway shapes that allow for three-point contact between the ferrule and passageway are intended to be within the scope of this invention. Passageway shapes that minimize the height and width of the holder are preferred. Passageways can be substantially cylindrical with three relatively small substantially flat portions at the circumference.

More specifically, the ferrule holders of this invention incorporate a means for securing the ferrule in the holder which comprises a means for indirect application of a radial directed force on the ferrule substantially directed toward the axis of the ferrule. Application of the radial force is mediated to the ferrule by a ferrule retention element. For example, the means for securing the ferrule can be a tapped hole for receiving a screw. The tapped hole communicates with the ferrule retention element. Radial force is applied by tightening a screw in the tapped hole to contact the intermediate ferrule retention element which in turn contacts the ferrule. Application of the radial force urges the ferrule downward in the passageway to establish a secure three-point contact with the passageway. The intermediate ferrule retention element can comprise one or more elements. The ferrule retention element can, for example, be a resilient arm that is an integral part of the core forming a portion of the ferrule passageway or a separate displaceable element retained within a channel adjacent to the ferrule passageway. Alternatively, the ferrule retention means can comprise both a resilient arm and a separate channel element between the arm and the bottom of the tapped hole. In specific embodiments, the inner side of the ferrule retention element provides one of the passageway flats. Preferably a ferrule is secured in its holder at a minimum of two points along its length.

To facilitate longitudinal temperature compensation after an FFP is constructed, holders for use in PZT-tuned FFPs are provided with a plurality of means for applying a radial directed force to the ferrule. These means for applying a force to the ferrule also function to secure the ferrule in the holder. The points of application of force are aligned along the length of the holder body parallel to the longitudinal axis of the holder. In specific embodiments, these securing means for applying a force can be a plurality of tapped holes for receiving screws. The holes enter the holder body and communicate with the ferrule retention element. The longitudinal thermal expansion of the filter is adjustable by changing the points of contact along the length of the ferrule between the ferrule and the holder core. This is accomplished by tightening or loosening holder screws along the length of the ferrule.

PZT-tuned FFPs of this invention comprise two ferrule holders bonded to one or more intermediate PZTs. The FFP optical cavity is formed by insertion of ferrules into each holder. Application of a voltage to the PZT changes the relative axial positions of the ferrules and the optical cavity length to tune the FFP. Ferrule holders of PZT-tuned FFPs have a means for receiving and bonding to a PZT. The ferrule holders of this invention can, for example, comprise brackets extending from the holder for receiving PZTs or can have a flange sized to engage the passageway of a cylindrical PZT. Such a flange facilitates bonding of holders to the PZT and protects the optical cavity from excess adhesive. The holders and PZT are bonded to each other using controlled thicknesses of adhesive, typically epoxy. The ferrule holders of this invention while particularly adapted for PZT-tuned FFPs can generally be employed in any FFP, such as those tuned by varying temperature or refractive index.

The material selected for the holder core depends upon the type and relative amounts of materials used in the ferrules, in the peripheral region of the holder, and other materials in the holder. The core material is selected so that the force on a ferrule secured in the holder does not substantially change as a function of temperature. To achieve this result the core should have a thermal expansion coefficient substantially matched to that of the ferrules. It is preferred to use relatively low cost, easily machined metals, such as stainless steel, for the peripheral region of the holder. Metals having a thermal expansion coefficient substantially higher (more positive) than that of the ferrule material are preferred. Metals having thermal expansion coefficients greater than about 10 ppm/°C. are preferred in PZT-tuned FFPs in order to compensate for the negative temperature coefficient of the PZTs and provide for longitudinal temperature compensation. For use with Pyrex™, quartz or ceramic ferrules, low expansion metal alloys having thermal expansion coefficients less than or equal to about 8 ppm/°C. are preferred core materials. Generally, the core material is selected to have a thermal expansion coefficient that is within a factor of 2 of that of the ferrule material. More preferably the core is selected to have a thermal expansion coefficient within ±50% of that of the ferrules. For use with Pyrex™ ferrules, low expansion alloys having thermal expansion coefficients between about 8 and 1 ppm/°C. are preferred and those with thermal expansion coefficients between about 6 to 2 ppm/°C. are more preferred.

Other objects and benefits of this invention will be readily apparent to those of ordinary skill in the art upon consideration of the following non-limiting drawings and descriptions.

BRIEF DESCRIPTION OF THE DRAWINGS

FIG. 2A is a view of an exemplary ferrule holder of this invention with brackets provided for bonding to PZTs. FIG. 2B is a cross-sectional view of the ferrule holder of FIG. 2A showing the core and peripheral portions of the holder and a shaped passageway in the core for receiving a ferrule. FIG. 2C is an enlarged cross-section of the shaped passageway of FIG. 2B.

DETAILED DESCRIPTION OF THE INVENTION

Figure 1:
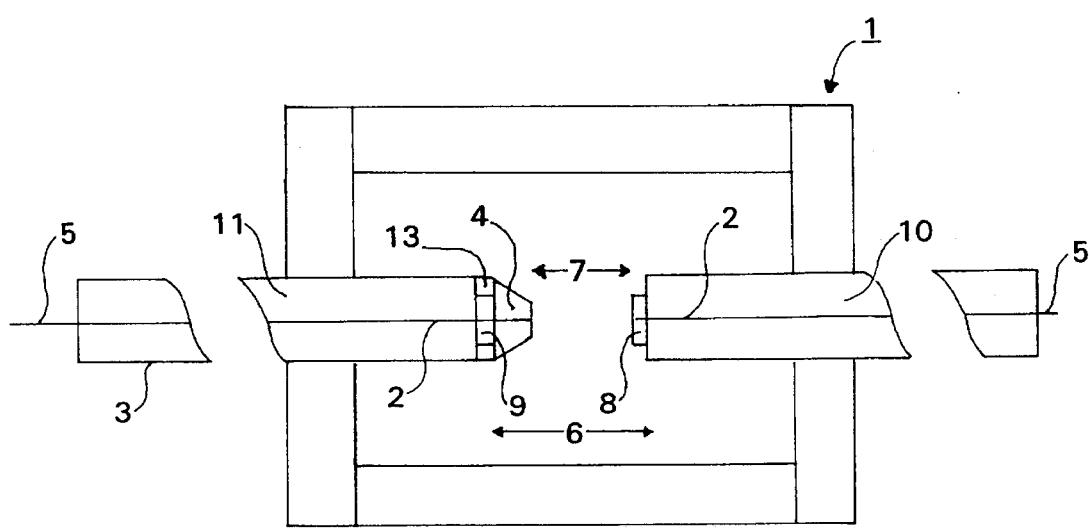
FIG. 1 is a schematic of an exemplary FFP fiber ferrule assembly combining a wafered-ferrule and a mirror-ended ferrule to form an optical cavity.

The ferrule holders of this invention are particularly adapted for use in temperature compensated PZT-tunable FFPs. Like the ferrule holders of U.S. patent application Ser. No. 08/161,702, the holders of this invention have shaped ferrule passageways to facilitate ferrule alignment by the incremental rotary alignment technique. In contrast to the holders of that earlier application, the holders of this invention have a composite body having two portions: a core and a peripheral region. The core and the peripheral region are made of materials having different thermal expansion coefficients selected to radially temperature compensate the holder by minimizing the change in force on a ferrule secured in the holder as a function of temperature. The difference in thermal expansion coefficients between the core material and the ferrule material substantially affects the force on the ferrule as a function of temperature. The material in the peripheral region and the relative amount of core to peripheral region (as reflected in the relative cross-sectional areas of the two regions) can also affect changes in force on the ferrule. The holder is also designed and holder materials selected to longitudinally compensate FFPs constructed with the ferrule holders by minimizing wavelength drift in such FFPs as a function of temperature. The holder must contain material having a positive thermal expansion coefficient sufficient to balance the effectively negative coefficient of PZTs. Each holder provides a plurality of contact points between the ferrule and the holder core along the length of the ferrule. The ability to vary these contact points allows adjustment of the longitudinal temperature coefficient of the FFP to minimize wavelength drift with the temperature after an FFP has been constructed.

Typically, fiber ferrules are made of materials having relatively low thermal expansion coefficients ($\alpha$) including glass, i.e. Pyrex™ ($\alpha$ about 3 to 4 ppm/°C.), or ceramics. Ferrule holders can, in principle be fabricated from any material that will provide a durable rigid support for the ferrules. Stainless steel, having a significantly higher $\alpha$ than the ferrule material, has typically been employed. (Low-expansion stainless steel has $\alpha$ of about 10 ppm/°C.) U.S. patent application Ser. No. 08/161,702 described the use of ferrule holders made of low-expansion metals, such as Kovar™, for temperature compensation in FFPs. In the ferrule holders of this invention, the peripheral region of the holder is made of a material, typically a metal, having a substantially higher thermal expansion coefficient than that of the ferrule material. The core which is in contact with the ferrule is selected to have thermal expansion coefficient substantially matched to that of the ferrule material. The use of the composite ferrule holder results in lower-cost FFPs which display excellent thermal behavior. The use of metals having $\alpha$ greater than about 8 ppm/°C. and preferably equal to or greater than 10 ppm/°C. in the peripheral region of the holder significantly improves longitudinal temperature compensation in PZT-tuned FFPs comprising the holder. PZT-tuned FFPs having the composite holders of this invention require thinner epoxy layers to achieve temperature compensation. Furthermore, wavelength drift in such FFPs can be adjusted over a larger range by changing the ferrule-holder contact points.

FIG. 1 schematically shows a typical FFP filter configuration with two ferrules (10 and 11) aligned within a supporting fixture (1). Each ferrule contains a substantially axial bore (2) along a longitudinal axis for receiving an optical fiber (5). The FFP shown contains a wafered ferrule (11) in combination with a mirror-ended ferrule (10), a single wafered-ferrule assembly. The wafered ferrule has a mirror (9) embedded between the ferrule (3) and the wafer (4). The axial optical fibers of the wafer and the ferrule are aligned and the two elements are bonded with epoxy (13). The embedded mirror (9) and the mirror (8) deposited at the end of ferrule (10) form the resonance cavity of the FFP filter, indicated by 6. In the FFP exemplified in FIG. 1, there is a small gap in the optical fiber (7) within the resonance cavity. The length of this gap is varied to tune the wavelength transmitted through the filter. The optical fibers of the ferrules of the FFP are aligned so that an optical signal can traverse the filter. The single-wafered ferrule assembly of FIG. 1 has been described in C. M. Miller U.S. Pat. No. 5,212,746, which is incorporated by reference herein. The details of construction of FFP ferrule assemblies and in particular the details of preparation of wafered ferrules with embedded mirrors and mirror-ended ferrules are given therein. Alternative FFP ferrule assemblies having a fiber gap within the resonance cavity include those having two mirror-ended ferrules or two wafered ferrules with embedded mirrors. FFP filters can also have a continuous fiber throughout the resonance cavity. In a FFP having a continuous fiber, the filter is tuned by stretching that fiber. Various fiber ferrule configurations can be employed in the FFPs of this invention. The single wafered ferrule design is preferred.

An electromechanically tunable FFP of this invention comprises PZTs bonded between two of the inventive ferrule holders with each ferrule holder providing a passageway for receiving a ferrule and means for securing the ferrules therein in relative alignment to maximize optical signal through the fibers of the ferrules. The ferrule assembly and its optical cavity are formed on insertion and alignment of the ferrules in the holders. The PZTs and the ferrule holders are bonded to each other such that application of a voltage to the PZT changes the optical cavity length of the ferrule assembly. The ferrules are secured in their holders such that the optical cavity can be varied without significant loss of fiber alignment.

FIGS. 2A–2C and 3 show different views of an exemplary ferrule holder of this invention. FIG. 2A is a top-view of ferrule holder (20A) having a body (21) with a passageway (22) through its length generally shaped and sized for closely receiving a fiber ferrule. The diameter of the passageway is slightly larger than that of the ferrule so that the ferrule is closely held in the passageway but can be inserted therein without binding. Ferrule passageway in the holder are typically substantially cylindrical.

The holder includes a plurality of tapped holes (23A–C) for screws (24A–C) which can be tightened to secure the ferrule in the holder. Holder 20A has brackets 25A and 25B extending outward from the body positioned generally toward the internal end (26) of the holder for bonding to rectangular PZTs. The holder optionally has a flange (27) extending around the passageway exit (28) at the internal end and sized to receive a protective sleeve.

The holder passageway 22 is shaped, as exemplified in FIG. 2B to include three substantially flat regions (30A–C). These flats provide three points of contact around the circumference of the ferrule and are preferably equiangularly disposed around the passageway. A force substantially perpendicular to the ferrule axis is applied to a ferrule in the passageway to secure the ferrule in the passageway and establish three-point contact. The force is applied toward the ferrule axis, for example by screws (24A, 24B or 24C, see FIG. 2A), at one of the three flats (e.g., 30A) of the passageway urging the ferrule to contact the remaining two flats establishing three-point contact. The force is applied directly to the ferrule or preferably indirectly through an intermediate ferrule retention element (31). This retention element can be a resilient arm (31), as in FIG. 2B, an integral portion of the core intermediate between the bottom of tapped holes (23A–C) and the ferrule in the passageway (22). The resilient arm (31) forms a portion of the shaped passageway containing a flat. The arm (31) is formed by extending a curved slot (32) into the core from the holder passageway (22). The slot intersects the bottoms of the tapped holes (e.g., 23A), so that screws (e.g., 24A) can contact arm (31). Flat (30A) is on the inner side (toward the passageway) of the arm (31). For convenience of machining the body, slot (32) which creates arm (31) extends the entire length of the holder body forming a channel.

FIG. 2C is a lateral cross-section of the holder showing the core (35) and peripheral region (36) of the body. The core is in direct contact with the peripheral region of the body along the length of the holder. Passageway (21) is formed in the core by precision machining. Resilient arm (31) is a part of the core also formed by precision machining. A ferrule inserted in the passageway (22) contacts the material of the core. Tapped holes (23A–C, FIG. 2C) extend from the outer surface of the body through the peripheral region into the core to intersect with the channel formed by slot (32).

The resilient arm (31) in FIG. 2B and 2C is shown approximately centered under the tapped screw holes. The flat 30A is also shown approximately centered on the arm under the tapped holes. The flat in the ferrule retention element is preferably aligned with the point of application of the radial force, i.e., aligned under the screw. However, the arm or other retention element itself need not be centered under the screw. For example, the flat can be positioned toward the free-end of the arm (33) and the screw aligned over the flat. In the specific arm configuration of FIG. 2B, it was found preferable to improve flexibility and durability of the arm (31) that angle (34), which defines the length of the slot (32) and arm (31), be about 90°.

The composite body of the holder is formed, for example, by press fitting, as is understood in the art, a rod of core material into an appropriately sized cavity in a piece of peripheral region material to form a composite precursor. The composite material is precision machined using methods appropriate to the selected materials to shape the holder and introduce the desired shaped passageway and ferrule retention element. Press fitting is particularly appropriate for making metal composite precursors, such as low-expansion metal cores in stainless steel.

Figure 3A:
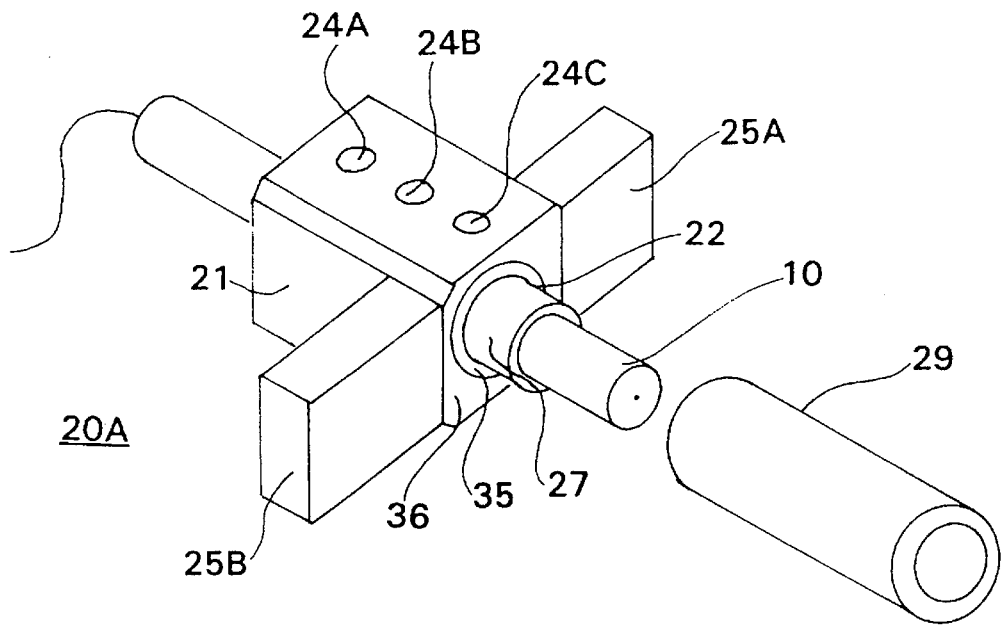
FIG. 3A is a perspective view of the ferrule holder of FIG. 2A with ferrule in place showing a flange at the internal end of holder for receiving a sleeve.
Figure 3B:
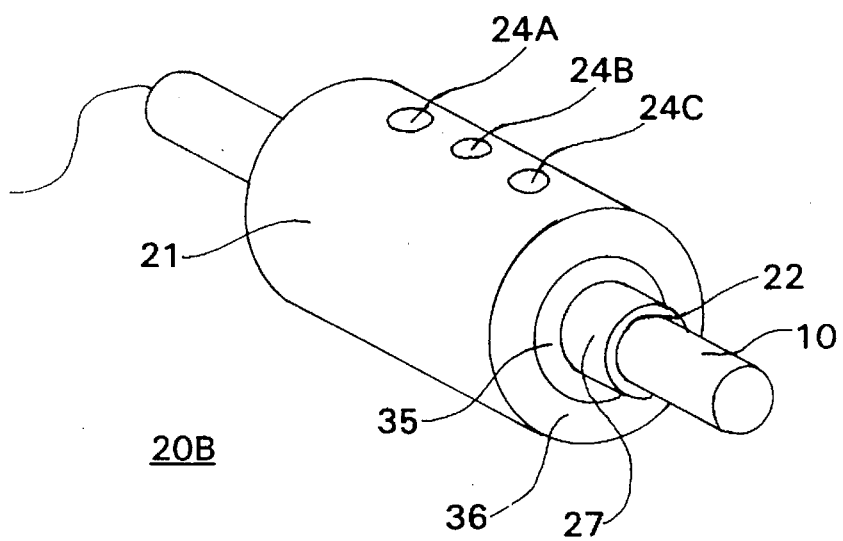
FIG. 3B is a perspective view of an alternate ferrule holder of this invention with ferrule in place showing a flange at the internal end of the holder for receiving a cylindrical PZT.

FIG. 3A is a perspective view of holder 20A of FIG. 2A showing a ferrule (10) in place in the holder. The ferrule end face containing the fiber end exits through flange (27). Also shown is protective sleeve (29) sized to engage the flange. This holder has brackets 25A and 25B for receiving and bonding to a PZT. The brackets and flange in the exemplified holder are integrally formed with the composite holder body. In the exemplified holder, the brackets are formed from the same material as the peripheral portion. FIG. 3B is a perspective view of an alternative ferrule holder (20B) of this invention designed for use with cylindrical PZTs. In holder 20B, flange (27) is sized to engage and receive the cylindrical passageway of the PZT. In both exemplified holders of FIGS. 3A and 3B, flange (37) is integrally formed with the holder body by machining the composite precursor, thus the inner portion of the flange (37) in contact with the ferrule is made of core material. Dependent upon the relative sizes of the core and peripheral regions of the body, the flange will have a core and may have a peripheral region.

Figure 4:
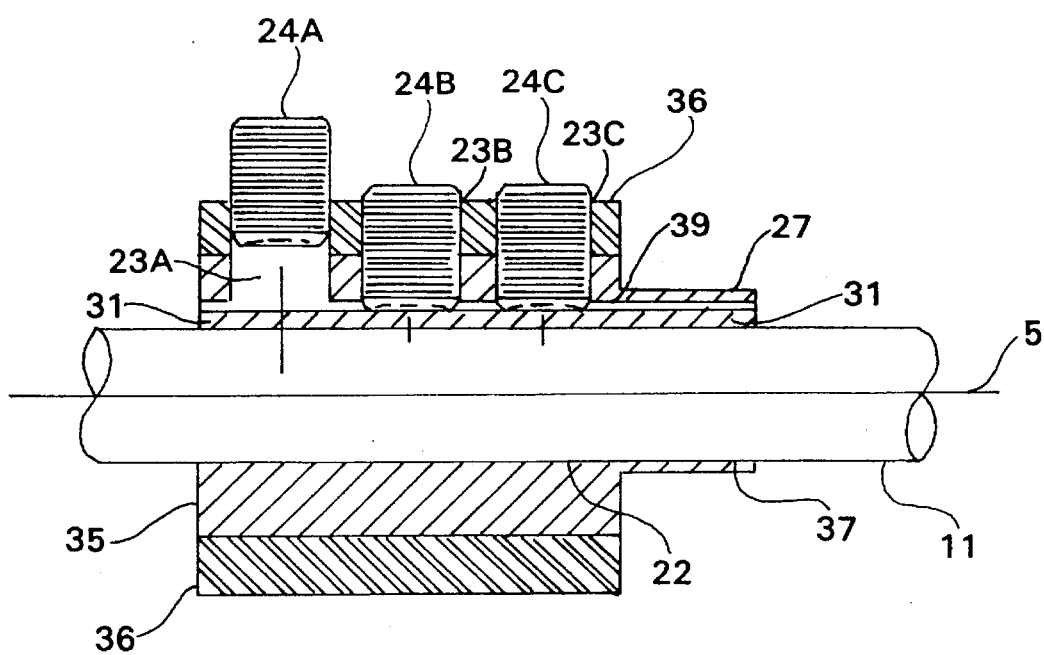
FIG. 4 is a longitudinal cross-section of an exemplary ferrule holder of this invention with ferrule held in place by tightening two screws of the holder.

FIG. 4 is a longitudinal cross-section of a ferrule holder (20A or 20B) with ferrule (10) in place. This view shows the core (35) and peripheral (36) region of the holder in relation to the tapped holes (23A–C) and flange (27). This view also shows channel (39), formed by slots (32 in FIG. 2B and 2C), extending the length of the holder.

It will be appreciated by those of ordinary skill in the art that many variations of shaped passageways can be employed to achieve the desired three-point contact with the ferrule. The inventive ferrule holders can also have alternate ferrule retention elements, for example an element separate from the core retained in position intermediate between the screw and the ferrule. U.S. patent application Ser. No. 08/161,702 describes alternative shaped passageways and alternative ferrule retention elements which facilitate rotary ferrule alignment and allow ferrules to be secured in the desired three-point contact. All the structural alternatives described therein can be readily adapted to and employed in the composite holders of this invention. In any such adaptations for the holder of this invention, it is preferred that any portion of the ferrule holder or ferrule retention element in contact with the ferrule be made of core material.

Figure 5A:
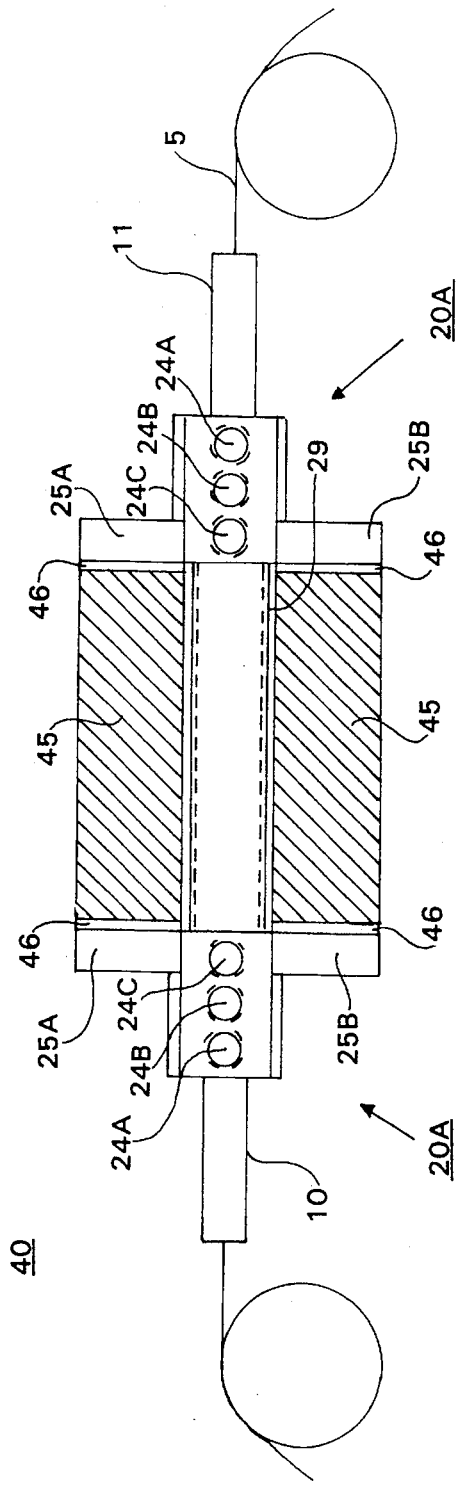
FIG. 5A is a view of a PZT-tuned FFP of this invention combining two ferrule holders of FIG. 2A.
Figure 5B:
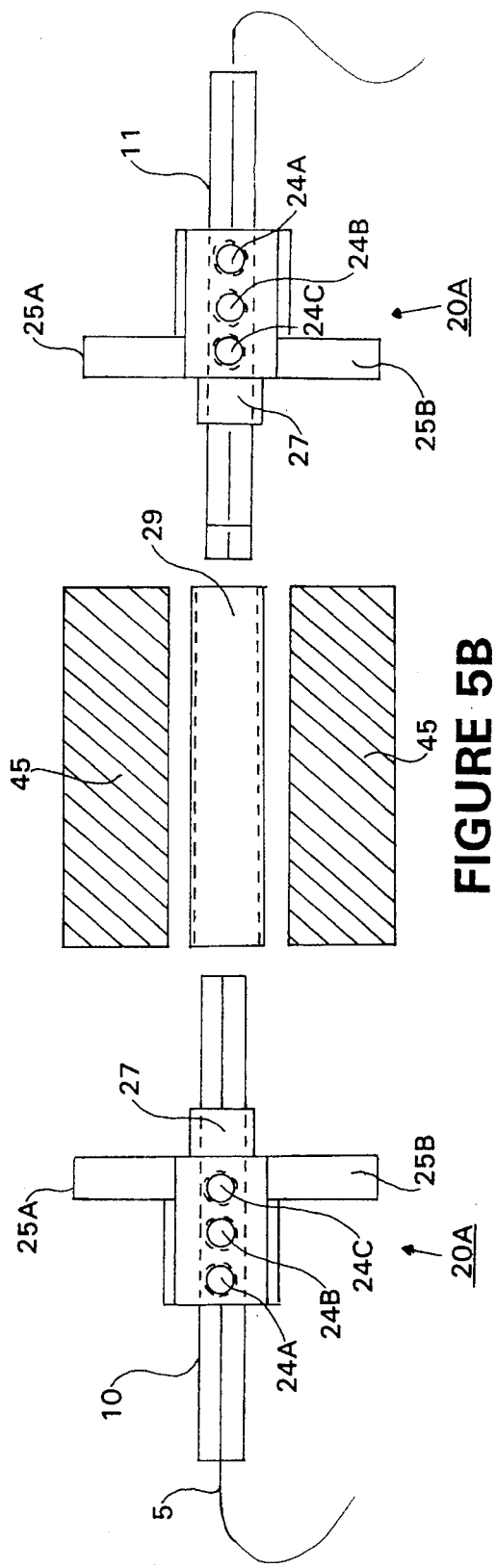
FIG. 5B is an exploded view of the FFP of FIG. 5A.

FIG. 5A is a top-view of a PZT-tuned FFP (40) of this invention having two ferrule holders (20A) of FIG. 3A. FIG. 5B is an exploded view of the same FFP showing the component parts thereof. Two rectangular PZTs (45) are bonded between aligned holder brackets of two ferrule holders using controlled epoxy thicknesses (46) as described below. Sleeve (29) extends between the holders and engages the flanges (27) of both holders. The optical cavity is formed between aligned ferrules (10) and (11) within the sleeve. This optional sleeve protects the optical cavity from dust and other particles from the surrounding environment and in particular excludes any excess epoxy that might accidentally be introduced into the cavity during construction of the FFP. Screws (24A–C) are aligned along the length of each holder. Application of a voltage to the PZTs changes the optical cavity length and tunes the FFP.

Figure 6A:
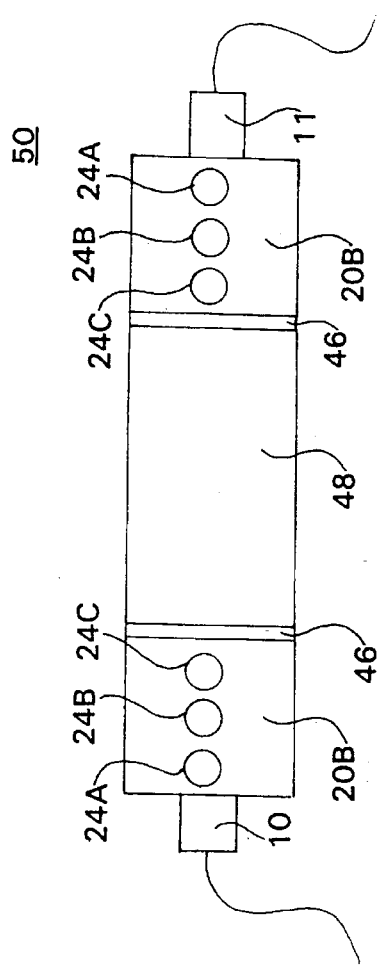
FIG. 6A is a view of a PZT-tuned FFP of this invention combining two ferrule holders of FIG. 3B with a cylindrical PZT.
Figure 6B:
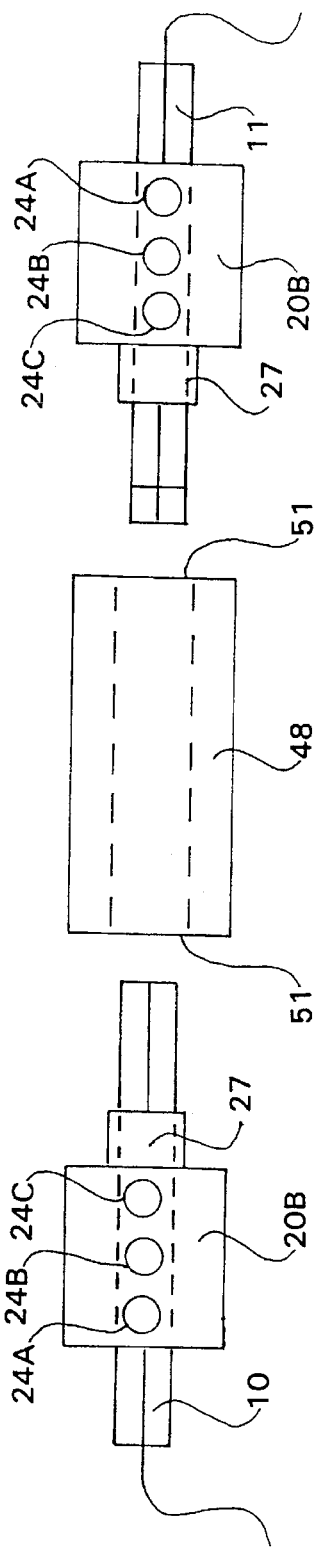
FIG. 6B is an exploded view of the FFP of FIG. 6A.

FIG. 6A is a top-view of a PZT-tuned FFP (50) of this invention having two ferrule holders of FIG. 3B. FIG. 6B is an exploded view of the same FFP showing the component parts thereof. A single cylindrical PZT (48) is bonded between holders 20B using controlled thicknesses of epoxy (46). The flanges (27) of both holders engage the passageway (51) of the PZT. The ferrules are inserted in the PZT passageway to form the optical cavity. Screws (24A–C) of the two holders are substantially aligned.

In the FFPs of FIG. 5A and 6A, the screws (24A–C) provide a plurality of adjustable means for applying a radially directed force to the ferrule in the passageway and establishing contact points between the ferrule and the holder core. As previously described in U.S. patent application Ser. No. 07/929,839, changing the points of contact along the length of a ferrule allows adjustment of the longitudinal thermal expansion coefficient of an FFP to minimize wavelength drift. The means for securing the ferrule in the holder thus also provide for temperature coefficient adjustment after the filter has been constructed. In the holders of this invention, it is preferred that a ferrule is secured at least two points along its length. Within this constraint, the points of contact along the ferrule can be adjusted as needed. For example, in the three-screw holders of FIGS. 5A and 6A, the middle screw (24B) is always tightened securing the ferrule and adjustments in temperature coefficient and wavelength drift are made by tightening either 24A or 24C.

For many applications FFPs must be temperature compensated to minimize the undesired effect of ambient temperature changes on cavity length (longitudinal effect). Insertional loss through fiber misalignment can also be caused by ambient temperature changes (radial effect). Detriment to alignment is minimized in FFPs if the force on the ferrule within the holder remains substantially constant as a function of temperature.

In the PZT-tuned FFPs of this invention temperature compensation is achieved by selection of core and peripheral materials and by the use of controlled thickness of positive thermal coefficient adhesive, such as epoxy, in the bonds between the holders and the PZT, as will be described below. A holder which provides substantially constant force on a ferrule as a function of temperature is achieved by choice of holder core material. Optical cavity length variation in PZT-tuned FFP is minimized by choice of holder materials and control of epoxy layers to balance the negative temperature coefficient of any PZTs. The ability to adjust the longitudinal contact points between the ferrule and the holder allows finer tuning of wavelength drift with temperature after an FFP is constructed.

Fiber ferrules are typically made from low-expansion glass like, Pyrex™. Quartz, other glasses and ceramics can also be used to fabricate fiber ferrules. The peripheral region of the holder is preferably made from a readily machinable metal, such as stainless steel. Such metals typically have thermal expansion coefficients, greater than or equal to about 10 ppm/°C., significantly higher than those of typical ferrule materials. Low-expansion metal alloys, i.e. those having a thermal expansion coefficient of about 8.0 ppm/°C. or less are suitable materials for preparation of core regions of the ferrule holders of this invention. Particularly suitable low-expansion allows are those containing nickel and iron, such as Invar™, ternary alloys of nickel, iron and cobalt, such as Kovar™, or ternary alloys of iron, cobalt and chromium, such as Elinvar™, all as described in M. A. Hunter (1961) Metals Handbook, American Society of Metals 8th Ed. (Taylor Lyman, ed.) Volume 1, p. 816–819. It is, in principle, possible to make an alloy with a desired low thermal expansion coefficient by variation of its component elements as known in the art and as described in Hunter (1961), supra. It is, however, more efficient and less expensive to employ commercially available alloys, like Kovar™ or Invar™. As is understood in the art, the thermal expansion coefficients of low-expansion alloys may vary dependent upon the processing used to make the alloy. The thermal expansion coefficients of a commercially-available material at a given temperature can typically be obtained from the manufacturer. Alternatively, thermal expansion coefficients of a given material at a given temperature can be determined empirically by methods well-known in the art.

Knowledge of exact thermal expansion coefficients is not necessary to practice this invention. Materials for the core and peripheral regions and the relative cross-sectional areas of each material can be selected empirically by measuring the variation in force with temperature on a ferrule secured within a test holder.

It has been found empirically that a radially temperature compensated PZT-tuned FFP for Pyrex™ ($\alpha$ about 3–4 ppm/°C.) ferrules can be made using a ferrule holder of FIG. 2A–C having a core of Kovar™ ($\alpha$ about 5–6 ppm/°C.) and a peripheral region of low-expansion stainless steel ($\alpha$ about 10 ppm/°C.) provided with stainless steel screws. The relative radial cross-sectional areas of Kovar™ core to the stainless steel peripheral region in this holder were about 1:1. In a Kovar™-stainless steel holder of FIG. 2A–C, good thermal behavior was displayed with about 0.21" diameter Kovar™ core in a 0.25"×0.25" (length×width) peripheral region with a core passageway diameter of about 0.10".

As is known in the art, thermal expansion of composite materials depends generally on the shapes and relative dimensions of the components of the composite and the thermal expansion coefficients of the components. In the composite holder of this invention, the core must have sufficiently large cross-sectional area to accommodate the ferrule passageway and ferrule retention element. The peripheral region must have a positive thermal expansion coefficient sufficiently high and its cross-sectional area in the holder sufficiently large for longitudinal temperature compensation in the FFP filter in which it will be used. Furthermore, the relative sizes of the two regions is limited by the desired outside dimensions of the holder and FFP. Within these constraints the relative cross-sectional area of the core and peripheral region can be varied. The cross-sectional areas of the core to the peripheral region are typically within a factor of 10 or less of each other, i.e the relative cross-sectional areas range from 1:10 to 10:1. Preferably the cross-sectional areas are within a factor of 5 or less from each other, i.e relative cross-sectional areas from 1:5 to 5:1. More preferably the relative cross-sectional areas will range from 1:3 to 3:1.

Such general principles can be used to select appropriate materials for the core and peripheral regions of the holder to achieve temperature compensation. The temperature compensation achieved by any particular selection of materials for holders and screws and for the relative sizes of the core and peripheral regions of the holder can be readily tested. A test filter is fabricated from materials selected according to the general principles discussed above. The ferrules are secured in the holder at room temperature and the force required to rotate a ferrule is measured. In preferred temperature compensated FFPs, the force required to rotate the ferrule will remain substantially the same (i.e., with less than about ±10% change) as the temperature is changed over a range of temperature from about −25° C. to +85° C. Preferred temperature compensated FFPs are those in which the change in the force required to rotate the ferrule is minimized as a function of temperature.

In general, satisfactory radial temperature compensation of FFPs can be achieved if the core is a material having a thermal expansion coefficient within a factor of two higher or lower than that of the ferrule material. Over this range, the relative cross-sectional areas of the core and peripheral region as well as choice of materials for ferrule retention elements and or screws can be made to satisfactorily compensate force on the ferrule in the holder.

In general, the passageways in the ferrule holders of this invention are shaped by any high precision machining techniques appropriate for the material chosen. Low-expansion alloys can be difficult to machine, however, electron discharge machining techniques, as are well-known in the art, can be employed to introduce the desired shaped passageways, channels and slots in the inventive holders.

The details of construction of ferrules, and ferrule assemblies, the deposition of mirrors, and the characteristics of various fiber ferrule configurations for FFPs are well-known in the art and have also been discussed, for example, in U.S. Pat. Nos. 5,212,745, 5,062,684, and 4,861,136. For low-loss, high-finesse FFPs, it has been found important to employ high precision polishing of fiber ends to achieve high-precision fiber end perpendicularity to the fiber core (preferably 0.02° or less). Opposing ends of ferrules forming the optical cavity are preferably polished to be essentially parallel. FFP mirrors have typically been produced by deposition of multiple layers of quarter-wavelength stacks of $Si/SiO_2$. Improved low-loss FFPs can be produced by use of mirrors formed by deposition of multiple layers of $TiO_2/SiO_2$, as described in J. Stone and L. W. Stulz (1991) Electronics Letts. 27(24):2239–40.

The term fiber alignment is used herein to refer to alignment of optical fibers through the ferrule assembly of the FFP. Fibers are aligned to maximize optical signal through the filter. To achieve a low-loss filter, high precision, close tolerance alignment of the optical fibers is necessary. The rotary alignment method which has been described in U.S. Pat. No. 4,545,644 for active alignment of fibers in optical fiber splice provides high-precision alignment needed for low-loss filters. The method as described therein, which is incorporated by reference herein, is applied to align the fibers of the FFPs of this invention. Briefly, the method involves step-wise rotation of the ferrules in the fixture relative to each other to achieve maximum overlap of the fibers as measured by maximum signal (or minimum scattering) through the filter. As applied to the inventive FFPs, the ferrules are inserted into the ferrule holders and partially secured therein to provide some resistance to rotation. Optical signal through the filter is monitored while one ferrule is rotated in the holder until a maximum signal is obtained. The other ferrule is then rotated in the holder until a second maximum is obtained. The first ferrule is then rotated to achieve a third maximum. This step wise process is continued until no further signal improvement is observed. As described in U.S. Pat. No. 4,545,644, to avoid local maxima and expedite the alignment process, one ferrule can be intentionally set off the position of maximum output and the other ferrule rotated to obtain a maximum. After the desired alignment is obtained the ferrules are tightly secured within the holders. The three-point contact that is obtained in the holders of this invention provides more stable alignment compared to methods in which set screws are use to adjust the position of the ferrule within the holder. The three-point contact essentially secures the ferrules in a V-groove substantially preventing rotation of the ferrules in the holder and thus preserving fiber alignment. Furthermore, this means of alignment and of securing the ferrules in alignment in the FFP retains high precision alignment but allows longitudinal variation in the cavity length so that the filter can be tuned.

The rotary alignment technique as described in U.S. Pat. No. 4,545,644 requires an alignment fixture offset. This feature increases the offset between the fiber axes of the two ferrules in the rotary mechanical splice fixture to facilitate rotary alignment of ferrules. It has been found empirically in the PZT-tuned FFPs of this invention that there is no need to incorporate such a fixture offset to increase the offset between fiber axes in the FFP. Typically, there is sufficient fiber axis offset resulting from ferrule mismatch, variations in individually machined parts and variations resulting from bonding the holders to the PZT to allow the rotary alignment technique to be use. In the rare event that the fiber axes offset is not sufficient in an FFP, simply substituting one of the ferrules for another will generate the required offset.

In general, any means for selectively applying a radial force to the ferrule directly or indirectly via the ferrule retention element can be employed. Screws provide a simple practical means for applying such a force. Screws employed in the FFPs of this invention are preferably sealed with a silicon thread sealer to keep moisture out of the FFP. Screws employed can be made of the same material as the core or peripheral portion of the holder. Since low-expansion metal alloys are difficult to machine it may be impractical to employ screws made of these alloys. As noted above, the material selected for screws can affect temperature compensation. Screws with cupped-ends which tightly grip the surface against which they are tightened have been used. Any sharp edges of cupped screws may be blunted to minimize damage to the ferrule retention element. Other types of fasteners, particularly spring fasteners can be readily adapted to provide the desired radial force to secure ferrules in holders.

FFPs of this invention can employ piezoelectric transducers which transform electrical energy into mechanical energy by utilizing the piezoelectric longitudinal effect. PZTs elongate along one axis on application of an electric field and the elongation is proportional to the applied field. Electrostrictive materials which elongate on application of a field, but in which the elongation is proportional to the square of the applied field can also be employed in the FFPs of this invention to vary optical cavity length. Like PZTs, electrostrictive materials will display negative temperature coefficients, the effect of which can be compensated as described herein specifically for PZT-tuned FFPs.

Temperature compensated FFPs using the ferrule holders of this invention are constructed by first determining the amount of positive temperature coefficient adhesive in PZT to holder joints required to balance the negative temperature coefficient of the PZT. This is done in a test filter as described in U.S. patent application Ser. No. 07/929,836, now allowed. The thickness of the adhesive layers between the ends of the PZT and the brackets or internal ends of each ferrule holder is controlled, for example, by inserting gauge wires as spacers between components to be bonded. The thickness of the epoxy layer required in a given type of FFP depends upon the specific fixture design and size, the types of material used for ferrules and in the core and peripheral portions of the holder, the relative amounts of different materials, the relative placement of materials in the FFP and the size and type of PZTs. The thickness of the epoxy layers used to bond the PZTs to the brackets or holder end in a test FFP is varied in test filters until wavelength drift as a function of temperature is minimized. Preferably, epoxy thicknesses are adjusted in the test filter so that the wavelength drift of the filter is equal to or less than 0.1 FSR/15° C. FFPs of the same design as the test FFP are then constructed using the experimentally determined epoxy thicknesses which gave a minimum temperature drift in the test FFP.

To control epoxy thickness, a gauge wire is inserted between the end of the PZT and the bracket to which it is to be bonded. A drop of epoxy is applied in the joint sufficient to cover the entire area of the joint. The area of the joint typically corresponds to the area of the end of the PZT. Uniform pressure is applied across the joint and excess epoxy which is squeezed out of the joint is removed. A uniform controlled thickness of epoxy results after curing of the epoxy. It has been found that steel gauge wires are suitable spacers for forming the desired controlled thickness epoxy layers. It is not necessarily the case that the thicknesses of the epoxy layers is equal to the diameter of the gauge wire. However, the use of the same gauge of wire will give reproducibly controlled thicknesses of epoxy in FFP joints. This method employing experimentally selected steel gauge wires and the application of uniform manual force was found to result in FFPs with substantially reproducible low temperature coefficients. Consistency in manufacture may be further improved by application of uniform mechanical force across the joints, such as by the application of adjustable clamps or like devices.

The type of epoxy used is selected such that a layer that is thick enough to balance the negative temperature coefficient of the PZTs is thick enough to provide a good bond.

In cases where epoxy layers greater than about 10 μm thick are required, it is preferred to employ multiple thinner layers of epoxy separated by spacers to bond PZTs between ferrule holders. These multiple thinner layers of epoxy are more durable than a single thicker layer of epoxy. Multiple controlled-thickness layers are formed by using multiple gauge wires between aluminum washers, for example, as spacers.

In general, any means for obtaining a controlled thickness of adhesive (or a controlled amount of adhesive) in a joint can be employed in the construction of temperature compensated filters of this invention. For example, the face of the holder to which the PZT will be bonded can be provided with a precisely machined groove for receiving and positioning the PZT. In addition, one or more spacing ridges can be precisely machined on the face of the support bracket to serve as a non-deformable spacer for generating an epoxy joint of uniform thickness.

FFPs of this invention are conveniently constructed by inserting a straight smooth rod of ferrule material through the passageways of the component ferrule holders and PZT, aligning the components along that rod, and bonding the components together with the rod in place. Bonding is accomplished by inserting gauge wires, applying epoxy for both a bond and clamping the filter components together. Bonds to PZTs may be formed in a step-wise fashion or both may be formed at the same time. This method has been found to give excellent reproducibility. The reproducibility of a method for construction a temperature compensated FFP can be assessed by determining an average temperature coefficient of a number of FFPs prepared employing that method.

While it has been found unnecessary to specifically provide an alignment fixture offset within the FFP to facilitate rotary alignment, an offset can be introduced when constructing the FFP if it is desired. In the FFPs of this invention, an alignment fixture offset can be optionally introduced by creating a flat portion on the glass rod employed to align the FFP components for bonding.

The FFPs of this invention, particularly those that are temperature compensated can be employed in combination with wavelocking circuity as is know in the art.

The temperature compensated FFPs described herein were constructed at normal room temperatures. The empirical balancing of temperature coefficients of the filters described herein was assessed within the expected normal operational temperatures (−25° C.−+85° C.) of the filter. Temperature drift is typically assessed by heating the test FFP above room temperature and/or cooling it below room temperature.

The term high precision as employed herein as used with in reference to alignment fixtures, spacers and machining and refer to machining to a minimum precision of about 0.0001 inch (¹/₁₀ mil).

The term optical as used in "optical fiber", "optical cavity" or "optical transmission" herein refers to electromagnetic radiation having a wavelength such that the radiation can be transmitted by means of dielectric fibers with loss less than 25 db/Km. Presently, wavelengths in the range of 400 to 2,000 nm can be transmitted by optical fibers. The term "optically continuous" refers to optical fibers through which an optical signal can be transmitted. An optically continuous fiber may contain fiber ends or small fiber gaps so long as an optical signal can traverse the fiber. While FFPs have typically been employed for communications applications, with appropriate choice of materials FFPs can be employed for filtering of wavelengths other than those used in communication.

The ferrule holders of this invention can be adapted for use in fiber connectors and non-PZT-tuned FFPs. For example, two ferrule holders can be aligned, spaced and bonded together to provide a fiber splice fixture or a fixed-wavelength FFP. Alternatively, a ferrule holder and its passageway can be elongated to receive a ferrule at either longitudinal end and provided with means for securing ferrules; aligned with end faces opposed, in three-point contact in the holder.

PZT-tunable FFPs of this invention can employ cylindrical PZTs having a passageway extending along its elongation axis. The optical cavity of the FFP is formed within the passageway of the PZT between the mirrors of two inserted ferrules. The cylindrical PZT minimizes the height and width of the FFP and greatly facilitates its use in confined spaces such as on circuit boards. With commercially available PZTs, and ferrule material, FFPs of this invention suitable for circuit board use can be constructed that are about 6.8 mm high, about 10 mm wide and about 30 mm long.

The FFPs of this invention can be employed in any device applications known in the art for FFPs. When necessary or beneficial FFPs can be mounted into devices using conventional art-known techniques of mechanical isolation to allow desired expansion of the cavity length and wavelength tuning. Miniaturized FFPs can be mounted onto circuit boards for example in foam holders, such as neoprene holders, which mechanically isolate the FFP from its surroundings, yet allow desired longitudinal expansion of the PZT and exert no forces which might disrupt alignment of the optical fibers of the FFP. Miniaturized FFPs are useful in any application where the size of a device is a concern. Miniaturized FFPs are particularly attractive for applications which require the use of multiple FFPs, for example in multi-channel selection, to minimize device size.

Recently, fixed wavelength and tunable fiber optic lasers having sub-millimeter gain cavities have been constructed using low-loss, high-finesse fiber ferrule resonance cavity configurations supported in low-loss ferrule alignment fixtures have been described. U.S. patent application Ser. No. 08/201,197 filed Feb. 24, 1994. The ferule holders and alignment fixtures of the present invention can also be employed in FFP lasers in both single-cavity and multiple-cavity laser configurations.

The FFPs of this invention are tunable by application of an electric field to a PZT. A tunable FFP is a filter in which the wavelength or frequency of the transmission output of the filter is changed, shifted or tuned by changing the optical path length of the resonance cavity of the FFP. In contrast a fixed FFP is intended to transmit a fixed wavelength (or frequency) and to be operated at a substantially constant optical cavity length between the mirrors. In some fixed FFP applications, it may be desirable that the FFP be capable of small cavity length changes, for example to adjust to small source fluctuations. A filter that is tunable over a small range, e.g., less than 30% of an FSR is a narrowly tunable or trimable FFP. FFPs of this invention can be employed in applications requiring either tunable or trimable fixed FFPs.

Fixed cavity length FFPs can be tuned by changing the temperature of the filter or by changing refractive index. The ferrule holders of this invention while particularly adapted for use in PZT-tuned FFPs can be employed in combination with temperature tuning methods and tuning by changing the refractive index.

As will be appreciated by those in the art, chromatic dispersion, waveguide dispersion, inaccuracies in spectrum analysis, and errors in measurement can add to the measured variation in FSR as a function of wavelength. Methods for the minimization of such dispersion effects and inaccuracies are well-known in the art. It is also well-known in the art that the wavelength range over which a FFP is operable (operable wavelength range) is limited by the wavelength dependence of the mirrors employed.

It will also be appreciated that the configurations, materials and techniques specifically described and exemplified herein can be modified, altered or adapted to achieve the objectives of this invention. All such alterations and modifications that embody the principles of this invention are encompassed within the spirit and scope of this invention.

We claim:

1. A ferrule holder comprising:

a body having a core and a peripheral region around the periphery of the core both extending the length of the body, a passageway through the body core for receiving a ferrule extending the length of the body, shaped to provide flats for three-point contact between the ferrule and the core and sized to provide a close fit with the ferrule at the passageway flats yet allowing rotation of the ferrule in the passageway and means for securing the ferrule in the passageway to establish three-point contact with the holder body wherein the body core is made of a material having a thermal expansion coefficient substantially matched to that of the thermal expansion coefficient of the ferrule material.

2. The ferrule holder of claim 1 wherein said means for securing the ferrule in the passageway comprises a means for applying a force on the ferrule substantially perpendicular to its longitudinal axis, the point of application of the force positioned with respect to the passageway flats such that on application of the force three-point contact is established between the ferrule and the holder.

3. The ferrule holder of claim 2 wherein said body comprises a tapped hole for receiving a screw, the screw hole extending from the outer surface of the holder into the core such that a screw tightened therein functions as the means for applying a force to the ferrule.

4. The ferrule holder of claim 3 which comprises a plurality of tapped screw holes along the length of the body each extending from the outer surface of the body into the core such that a screw tightened into any of the holes will function as a means for applying a force to the ferrule and each screw hole aligned in the body along the length of the passageway positioned with respect to the passageway flats such that on application of the force three-point contact is established between the ferrule and the holder.

5. The ferrule holder of claim 2 wherein said means for securing the ferrule in the passageway also comprises a displaceable ferrule retention element having an upper side and a lower side having a flat, the element positioned in the holder body intermediate between a ferrule in the passageway and the means for applying a force to the ferrule, the inner side of the retention element forming a portion of the shaped passageway and providing a flat in the passageway wherein when the force is applied the ferrule retention element is displaced toward the ferrule with the flat of its lower side contacting the ferrule and urging the ferrule in turn to contact the other two passageway flats to establish three-point contact between the ferrule and the core and thereby secure the ferrule in the passageway.

6. The ferrule holder of claim 5 wherein the ferrule retention element is made of the same material as the core.

7. The ferrule holder of claim 6 wherein the holder body further comprises a tapped hole for receiving a screw which functions as the means for applying a force to the ferrule, the screw hole extending from the outer surface of the holder into the core communicating with upper surface of the ferrule retention element.

8. The ferrule holder of claim 7 which comprises a plurality of tapped screw holes along the length of the body each extending from the outer surface of the body into the core such that a screw tightened into any of the holes will function as a means for applying a force to the ferrule and each screw hole positioned with respect to the passageway flats such that on application of the force three-point contact is established between the ferrule and the holder.

9. The ferrule holder of claim 5 wherein the ferrule retention element is a resiliently displaceable arm integrally formed with the core the lower side of which forms a portion of the passageway and provides a flat in the passageway.

10. The ferrule holder of claim 9 wherein the holder body further comprises a tapped hole for receiving a screw which functions as the means for applying a force to the ferrule, the screw hole extending from the outer surface of the holder into the core communicating with the upper surface of the displaceable arm.

11. The ferrule holder of claim 10 which comprises a plurality of tapped screw holes along the length of the body each extending from the outer surface of the body into the core such that a screw tightened into any of the holes will function as a means for applying a force to the ferrule and each screw hole positioned with respect to the passageway flats such that on application of the force three-point contact is established between the ferrule and the holder.

12. The ferrule holder of claim 11 for use with Pyrex™ ferrules wherein the core is made of Kovar™ and the peripheral region and screws are made of stainless steel.

13. The ferrule holder of claim 1 further comprising a flange the outer diameter of which is sized to receive a cylindrical piezoelectric transducer for bonding to the body extending outward from one longitudinal end of the body around the core passageway exit.

14. The ferrule holder of claim 13 wherein the outer diameter of the flange is sized for insertion in the passageway of a cylindrical piezoelectric transducer.

15. The ferrule holder of claim 1 further comprising a plurality of brackets substantially perpendicular to the longitudinal axis of the body for receiving and bonding to a piezoelectric transducer.

16. The ferrule holder of claim 16 further comprising a flange extending outward from one longitudinal end of the body sized to receive a sleeve.

17. A ferrule holder which comprises a body having a core extending the length of the body and a peripheral region around the periphery of the core which also extends the length of the body, a passageway through the body core for receiving a ferrule extending the length of the body, shaped to provide three flats positioned equiangularly around the passageway and sized to provide a close fit with the ferrule yet allowing rotation of the ferrule in the passageway to provide three-point contact between the ferrule and the body core, a displaceable ferrule retention element having an upper and a lower side with a flat region thereon positioned in the holder body with the inner side of the retention element forming a portion of the shaped passageway and providing one of the three flats in the holder passageway a plurality of tapped holes for receiving screws in the holder body substantially aligned along the length of the body passageway extending from the body surface into the body core communicating with the ferrule retention element wherein tightening a screw in a screw hole applies a force substantially perpendicular to the longitudinal axis of the ferrule displacing the ferrule retention element such that the flat of its lower side contacts a ferrule in the passageway and urges the ferrule in turn to contact the passageway flats to establish three-point contact with the holder and thereby secure the ferrule in the passageway and wherein the body core is made of a material having a thermal expansion coefficient substantially matched to that of the thermal expansion coefficient of the ferrule material.

18. The ferrule holder of claim 17 wherein the ferrule retention element is a resiliently displaceable arm integrally formed from the core the lower side of which comprises a flat and forms a portion of the ferrule passageway.

19. The ferrule holder of claim 17 for use with Pyrex™ ferrules in which the core is made of Kovar™ and the peripheral region and screws are stainless steel.

20. The ferrule holder of claim 17 further comprising a plurality of brackets extending outward from the body substantially perpendicular to the longitudinal axis of the body for receiving and bonding to a piezoelectric transducer.

21. The ferrule holder of claim 20 further comprising a flange extending outward from one longitudinal end of the body around the passageway the outer diameter of which is sized to receive a sleeve.

22. The ferrule holder of claim 17 further comprising a flange extending from one longitudinal end of the body around the passageway the outer diameter of which is sized to receive a cylindrical piezoelectric transducer.

23. The ferrule holder of claim 17 wherein the peripheral region is made of a metal having a thermal expansion coefficient greater or equal to about 10 ppm/°C. and the core region is made of a low-expansion metal alloy having a thermal expansion coefficient less than or equal to 8 ppm/°C.

24. The ferrule holder of claim 23 wherein the peripheral region is made of a metal having a thermal expansion coefficient greater than 10 ppm/°C. and the core region is made of a low-expansion metal alloy having a thermal expansion coefficient less than 8 ppm/°C.

* * * * *

ЮNITED STATES PATENT AND TRADEMARK OFFICE
CERTIFICATE OF CORRECTION

PATENT NO. : 5,563,973

DATED : Oct. 8, 1996

INVENTOR(S) : Calvin M. Miller and Jeffrey W. Miller

It is certified that errors appear in the above-identified patent and that said Letters Patent is hereby corrected as shown below:

At column 9, lines 36 and 38, please delete "(37)" and insert --(27)--.

At column 18, line 26, please delete "claim 16" and insert --claim 15--.

At column 20, line 3, please insert --than-- after "greater".

Signed and Sealed this

Eleventh Day of March, 1997

Attest:

BRUCE LEHMAN

Attesting Officer

Commissioner of Patents and Trademarks